United States Patent [19]

Gibbs

[11] 4,066,157

[45] Jan. 3, 1978

[54] IMPELLER DISCONNECT AND BRAKE MECHANISM

[75] Inventor: James Kiel Gibbs, Rockford, Ill.

[73] Assignee: Borg-Warner Corporation, Chicago, Ill.

[21] Appl. No.: 712,403

[22] Filed: Aug. 6, 1976

[51] Int. Cl.² .............................................. F16H 45/00
[52] U.S. Cl. ................................ 192/3.24; 192/12 A; 192/18 A; 192/113 B
[58] Field of Search .................... 192/3.24, 3.23, 3.34, 192/12 A, 4 B

[56] References Cited

U.S. PATENT DOCUMENTS

| | | | |
|---|---|---|---|
| 2,324,693 | 7/1943 | Griswold et al. | 192/3.23 X |
| 2,449,586 | 9/1948 | Carnagua | 74/339 X |
| 2,640,572 | 6/1953 | O'Brien | 192/3.2 |
| 2,949,047 | 8/1960 | Burckhardt | 74/723 |
| 3,041,892 | 7/1962 | Schjolin | 74/732 |
| 3,142,369 | 7/1964 | Atkins | 192/3.2 |
| 3,202,018 | 8/1965 | Hilpert | 192/3.33 X |

Primary Examiner—Benjamin W. Wyche
Attorney, Agent, or Firm—Robert L. Zieg

[57] ABSTRACT

A clutch and brake device for the impeller of a hydrodynamic device in which the clutch is engaged by selectively admitting pressure from a source of pressure to a clutch servomotor, this pressure being conducted to a release chamber for the brake servomotor to automatically release the brake, thus insuring proper timing of release of the brake and engagement of the clutch. The brake is applied by the charge pressure within the hydraulic torque converter which is applied to the opposite side of the piston for the brake with respect to the pressure from the source of pressure. Thus, when the pressure from the source of pressure is exhausted releasing the clutch, the charge pressure of the converter will automatically engage the brake. The charge pressure is also conducted to the release side of the piston for the clutch device, thus insuring the clutch will be fully released when the brake is engaged.

6 Claims, 1 Drawing Figure

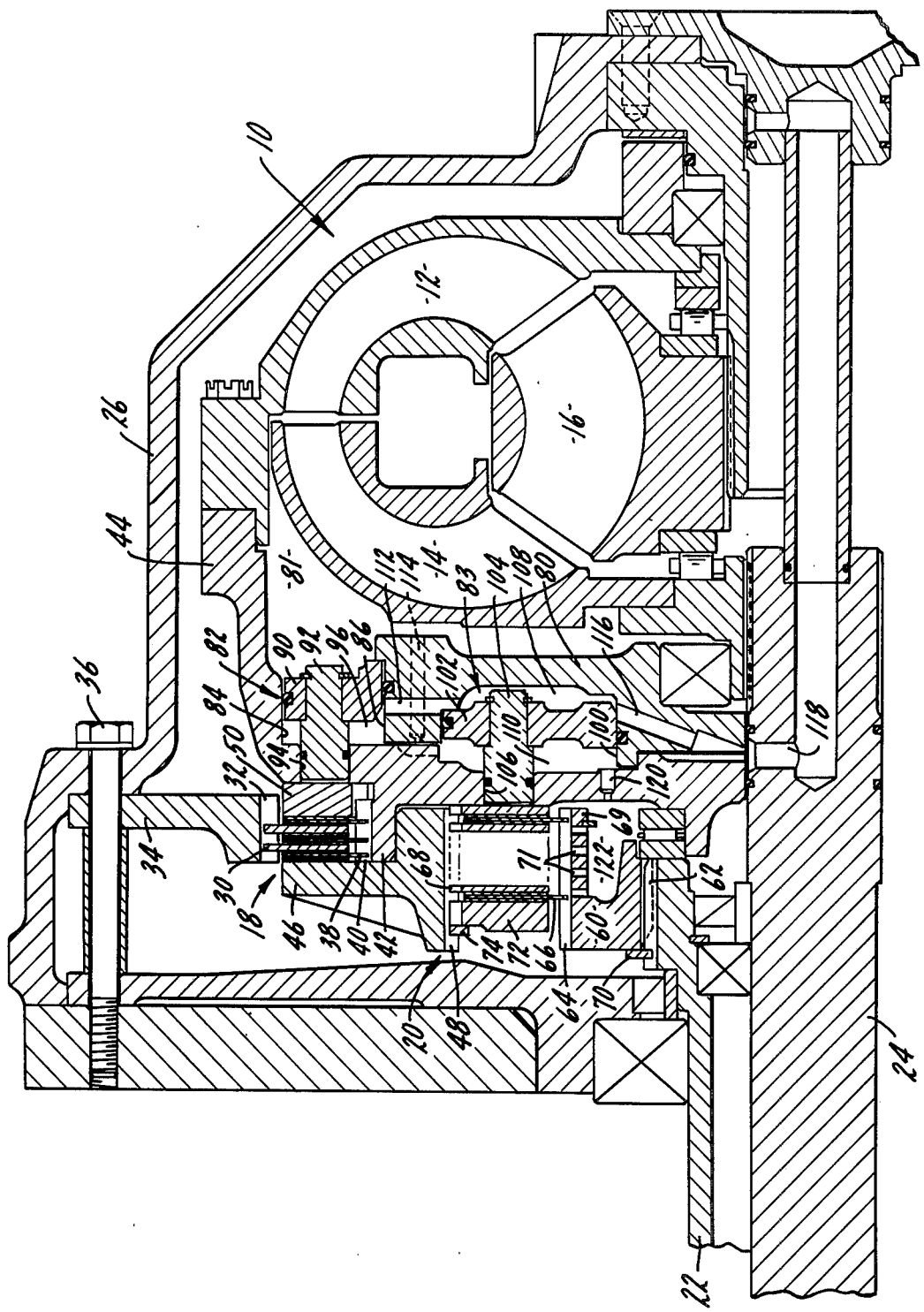

IMPELLER DISCONNECT AND BRAKE MECHANISM

BACKGROUND OF THE INVENTION

In hydrodynamic devices, particularly torque converter devices, for heavy equipment wherein large rotating masses are involved, it has been known to have a clutch mechanism which may be operative to disengage the drive to the impeller element of the converter and to have a brake for stopping rotation of the impeller and associated elements when desired. However, control of these devices has been found to require the operator to properly sequence the apply and exhaust pressure to disengage the clutch and engage the brake or vice-versa at the proper times. If the timing is not precisely done by the operator, the result will be an inefficient type of operation wherein the brake may come on before the clutch is released, thus placing unnecessary loads on the engine; or if the brake engages too late, the elements will be allowed to spin up and cause inefficiencies and a time delay in operation of the transmission device. The problem thus recognized in the prior art and not adequately solved is to properly time the sequence of engagement and disengagement of the clutch and brake devices such that during shifting of the transmission mechanism, the rotation of the parts will be halted and the shift completed in a minimum amount of time without creating inefficiencies.

SUMMARY OF THE INVENTION

The present invention solves the above-enumerated problems of the prior art by utilizing a clutch and brake device for the impeller of a hydrodynamic device in which the clutch is engaged by selectively admitting pressure from a source of pressure to engage the clutch, this pressure being conducted to a release chamber for the brake servomotor to automatically release the brake, thus insuring proper timing of release of the brake and engagement of the clutch. In addition, the brake is applied by the charge pressure within the hydraulic torque converter which is applied to the opposite side of the piston for the brake with respect to the release pressure applied to the piston from the source of pressure. Thus, when the pressure from the source of pressure is exhausted releasing the clutch, the charge pressure of the converter will automatically engage the brake. This charge pressure is also conducted to the release side of the piston for the clutch device, thus insuring that the clutch will be fully released when the brake is engaged.

BRIEF DESCRIPTION OF THE DRAWING

The single FIGURE of drawing comprises a cross-sectional view through a hydrodynamic device and associated parts incorporating the principles of the invention.

DETAILED DESCRIPTION OF THE INVENTION

Referring to the single FIGURE of the drawing, the present invention includes a hydraulic torque converter 10 including an impeller element 12, a turbine element 14 and a stator element 16. In association with hydraulic torque converter 10, there is provided a brake device 18 and a clutch device 20. A hollow input shaft 22 is provided which is adapted to transfer torque from an engine or power source to impeller 12. An output shaft 24 is provided mounted concentrically of input shaft 22. The turbine 14 is connected to output shaft 24 to drive same. The output shaft is further connected to a change speed transmission (not illustrated) which hydraulic torque converter 10 drives during operation of the vehicle. The hydraulic torque converter and associated elements are mounted in a stationary housing 26.

The brake device 18 comprises a plurality of friction plates 30 engaging with splines 32 on a fixed plate 34 secured to housing 26 by bolts 36, for example. Interleaved with plates 30 are a plurality of friction plates 38 connected with splines 40 provided on an extension 42 extending from an annular drive shell 44 connected to impeller 12. An annular reaction plate 46 is provided for the brake 18, having splines 48 on the internal diameter thereof. The reaction plate 46 is secured to shell 44 by bolts (not shown) seated in an annular seal plate 80, extending through annular drive shell 44 and threaded into plate 46. The brake device 18 further includes an apply plate 50.

The clutch device 20 has an inner driving member 60 which is connected to shaft 22 by splines 62 and has external splines 64 thereon. A plurality of friction clutch plates 66 are provided drivingly connected to splines 64. Interleaved with clutch plates 66 are a plurality of clutch plates 68 which are drivingly connected to splines 48 on reaction plate 46. The drive member 60 is secured in place by a snap ring 70 fixed in a groove on the outside diameter of splines 62. The member 60 includes an axially extending flange 69 which has radially disposed therethrough a plurality of lubricating orifices 71. Clutch 20 includes a reaction plate 72 connected to splines 48 and secured in place by snap ring 74 in a groove in splines 48.

Provided within the shell 44 is an annular seal plate 80 which defines chambers for servomotors for devices 18 and 20 and, in addition, together with shell 44, defines a converter charge pressure cavity 81. A hydraulic servomotor 82 is provided for brake 18 and a hydraulic servomotor 83 is provided for clutch 20. Hydraulic servomotor 82 includes an annular chamber 84, the outer diameter of which is defined by shell 44 and the inner diameter of which is defined by an outer diameter 86 on plate 80. Slidable within annular chamber 84 is an annular piston 90 secured to an apply pin 92. Apply pin 92 is slidable within a bore 94 in shell 44 and is adapted to engage apply plate 50 of brake 18 to apply the brake when desired. The piston 90 in cooperation with the annular chamber 84 defines a fluid pressure release chamber 96. Fluid pressure in chamber 96 will act on piston 90 to move it to the right as viewed in the drawing to release the brake 18. Fluid charge pressure for converter 10 in cavity 81 will act on the opposite side of piston 90 to move piston 90 to the left to urge plate 50 to engage brake 18.

Plate 80 further includes an internal annular bore 100 which has slidable therein an annular piston 102. Annular piston 102 is fixed on an apply pin 104 which is received within a bore 106 in shell 44. Piston 102 and bore 100 define a fluid pressure apply chamber 108 and the fluid pressure release chamber 110. The chamber 108 is connected by a radial passage 112 with release chamber 96 of servomotor 82. Release chamber 110 is connected with the converter charge pressure in cavity 81 by a passage 114 through plate 80. A radially disposed passage 116 connects apply chamber 108 to a fluid pressure passage 118 in output shaft 24 which is selectively connectable to a source of fluid pressure to apply clutch 20 when desired.

Shell 44 further includes an orifice 120 connecting release chamber 110 to a lubrication chamber 122 defined by axially extending portion 69 of member 60. Fluid pressure in chamber 12 will flow through multiple orifices 71 to lubricate clutch 20 and brake 18.

The operation of the brake 18 and clutch 20 is as follows. Normally fluid pressure is applied through passages 118 and 116 to chamber 108 to engage clutch 20 from an external pressure source (not illustrated). This pressure also flows to release chamber 96 of brake 18 to release same. Thus, with clutch 20 applied, torque will be transferred from shaft 22 through clutch 20 to impeller 12 to drive the transmission for the vehicle. When it is desired to change ratio, in a vehicle of the type in which the present invention is to be utilized, the clutch apply pressure in chamber 108 is selectively exhausted by the manual or automatic control (not illustrated). This will remove pressure from chambers 108 and 96. Converter charge pressure thus existing at this time in cavity 81 will act on piston 90 to engage brake 18. The charge pressure also flows through passage 114 to chamber 110 and will act on piston 102 to release clutch 20. Thus, at the instant that the pressure applying clutch 20 and releasing brake 18 is exhausted, converter charge pressure acting on the opposite sides of pistons 90 and 102 will apply brake 18 and release clutch 20.

Various features of the invention have been particularly shown and descirbed. However, it should be obvious to one skilled in the art that modifications may be made therein without departing from the scope of the invention.

What is claimed is:

1. A hydrodynamic device between input and output shafts including a driving element connectable to said input shaft and a driven element connected to said output shaft, an engageable brake device for holding said driving element stationary, an engageable clutch device for connecting said input shaft to said driving element, a fluid pressure operated servomotor for said brake device, a fluid pressure operated servomotor for operating said clutch device, a source of fluid pressure connectable to said clutch servomotor to engage said clutch, a fluid passage between said clutch servomotor and said brake servomotor, fluid pressure from said source when supplied to said clutch servomotor device engaging said clutch and acting on said brake servomotor to release said brake, a supply of fluid charge pressure in said hydrodynamic device and connected to said brake servomotor, a fluid passage connecting said charge pressure to the clutch servomotor whereby initially when fluid pressure is supplied from said source to said clutch servomotor, said pressure will engage said clutch and release said brake to provide drive to said driving element of the hydrodynamic device, and when said pressure from said source is exhausted, the charge pressure will act to engage said brake and release said clutch and thereby stop rotation of said driving element.

2. A hydrodynamic device as claimed in claim 1 wherein said device is a hydraulic torque converter having impeller, turbine and stator elements, and said driving element connectable to the input shaft is the fluid impeller element.

3. A hydrodynamic device for transmitting torque between input and output shafts including a driving element connectable to said input shaft and a driven element connected to said output shaft, an engageable brake device for holding said driving element stationary, an engageable clutch device for connecting said input shaft to said driving element, a fluid pressure operated servomotor for said brake device including a piston, a fluid pressure operated servomotor for operating said clutch device including a piston, a source of fluid pressure connectable to said clutch servomotor to engage said clutch, a fluid connection between said servomotor for said clutch and said servomotor for said brake, fluid pressure when supplied to said clutch device acting on said piston to engage said clutch and acting on said piston for the brake device to release said brake, a supply of fluid charge pressure in a cavity of said brake servomotor, a fluid passage connecting said charge pressure in said cavity to the servomotor for said clutch and acting on said clutch piston in a direction to release said clutch whereby initially when fluid pressure is supplied from said source to said clutch servomotor, said pressure will engage said clutch and release said brake to provide drive to said driving element of the hydrodynamic device, and when said pressure from said source is exhausted, the charge pressure will act to engage said brake and to release said clutch and thereby disconnect the drive to said driving element and stop rotation of said driving element.

4. A device as claimed in claim 3 in which said servomotors are radially arranged with respect to the axis of rotation of the hydrodynamic device.

5. A device as claimed in claim 3 wherein said charge pressure is connected through an orifice to said clutch device to lubricate same.

6. A device as claimed in claim 3 wherein said brake device and said clutch device are each friction devices having a plurality of frictionally engageable plates, said clutch having an outer annular element connected with said clutch plates, said outer annular element having means thereon in association with said brake device, and said element acting as a reaction element for said brake device.

* * * * *

UNITED STATES PATENT OFFICE
CERTIFICATE OF CORRECTION

PATENT NO. : 4,066,157

DATED : January 3, 1978

INVENTOR(S) : JAMES KIEL GIBBS

It is certified that error appears in the above-identified patent and that said Letters Patent are hereby corrected as shown below:

Column 4, lines 27 and 28, after "in a cavity of said" insert -- hydrodynamic device and exposed to said piston for said --.

Signed and Sealed this

Fourth Day of April 1978

[SEAL]

Attest:

RUTH C. MASON
Attesting Officer

LUTRELLE F. PARKER
Acting Commissioner of Patents and Trademarks